United States Patent [19]
Gutierrez, Jr.

[11] Patent Number: 5,794,850
[45] Date of Patent: Aug. 18, 1998

[54] ENCLOSED PRESSURE BALANCED SYNC RING NOZZLE

[75] Inventor: Jose L. Gutierrez, Jr., Ft. Lauderdale, Fla.

[73] Assignee: United Technologies Corporation, Hartford, Conn.

[21] Appl. No.: 721,888

[22] Filed: Sep. 27, 1996

[51] Int. Cl.$^6$ ............................................. B64C 15/06
[52] U.S. Cl. ............................ 239/127.1; 239/265.35; 239/265.41
[58] Field of Search ............... 239/265.19, 265.35, 239/265.37, 127.1, 265.31; 60/228–232

[56] References Cited

U.S. PATENT DOCUMENTS

| | | | |
|---|---|---|---|
| 3,897,907 | 8/1975 | Colley | 239/265.3 |
| 4,049,198 | 9/1977 | Mauren | 239/265.3 |
| 5,207,787 | 5/1993 | Lewis | 239/265.51 |

*Primary Examiner*—Kevin Weldon
*Attorney, Agent, or Firm*—Norman Friedland

[57] ABSTRACT

The C/D axisymmetrical exhaust nozzle for a gas turbine engine is designed to fit on the engine and STOVL aircraft and includes an hydraulic actuator and a combined load balancing piston/sync ring that is judiciously mounted in the assembly and discretely attached to a fulcrum link and the mechanism is enclosed between concentrically spaced static structure for defining a full-hoop configuration. The actuator is attached to flanges formed on the static structure to allow for access to the attaching bolts. Rollers are mounted on the sync ring to ease the rectilinear movement of the sync ring. Positioning the actuator rectilinearly rotates the fulcrum and connecting links to position the flaps for varying the throat size and C/D configuration for optimum engine performance.

7 Claims, 4 Drawing Sheets

ENCLOSED PRESSURE BALANCED SYNC RING NOZZLE

CROSS REFERENCES

The subject matter of this patent application relates to the subject matter of the patent application entitled "C/D Nozzle With Synchronous Ring Link Suspension" filed by Eric C. Ward (Atty. Docket No. F-7749) and patent application entitled "Compact Pressure Balanced Fulcrum-Link Exhaust Nozzle" filed by Alfredo Cires and Jennifer Groceman (Atty. Docket No. F-7677) all of which are being filed contemporaneously and are assigned to the same assignee of this patent application.

TECHNICAL FIELD

This invention relates to a compact axisymmetrical convergent/divergent exhaust nozzle utilized on a gas turbine engine for powering short take-off and landing aircraft (STOVL) and particularly to the construction of the pressure balanced synchronizing ring (sync ring) and construction of the actuation system.

BACKGROUND ART

There are a sundry of convergent/divergent (C/D) exhaust nozzles for gas turbine engines that are disclosed in the literature and that are utilized on jet and turbo jet engines for changing the throat configuration of the nozzle in order to improve engine performance during certain modes of operation. This is particularly the case in aircraft that are powered with gas turbine engines with augmentors. The exhaust nozzle may be configured in a two or three dimensional configuration with or without the capability of vectoring the exhaust gases. Obviously, the purpose of the vectoring nozzle is to effectuate directional change of or reversing thrust to brake the aircraft. Examples of prior art exhaust nozzles are disclosed in U.S. Pat. Nos. 3,792,815 granted to Swavely et al on Feb. 19, 1974 entitled "Balanced Flap Converging/Diverging Nozzle", 4,456,178 granted to Jones et al on Jun. 26, 1984 entitled "Exhaust Nozzle Assembly With Dual Unison Ring Structure", 4,456,178 granted to Wiley et al on May 8, 1984 entitled "Three-Dimensional Axially Translatable Convergent/Divergent Nozzle Assembly", 4,440,347 granted to Madden on Apr. 3, 1984 entitled "Simplified Means For Balancing The Loads On A Variable Area Nozzle", 4,440,346 granted to Wiley on Apr. 3, 1984 entitled "Axially Translatable Variable Area Convergent/Divergent Nozzle", 5,011,080 granted to Barcza on Apr. 30, 1991 entitled "Convergent/Divergent Nozzle Construction", and 5,215,256 granted to Barcza on Jun. 1, 1993 entitled "Flap Hinge Arrangement For A Convergent/Divergent Nozzle" all of which are assigned to the assignee common to the assignee of this patent application and 3,899,133 granted to Cambouliaves et al on Aug. 12, 1975 entitled "Nozzles Having A Variable Cross-Section".

Also well known in this art is that engineers and scientist are endeavoring to design and produce a gas turbine engine that is capable of use for STOVL operation for single as well as multiple engine aircraft. Also well known is that the exhaust nozzle may include positional flaps that are articulated to provide vectoring capabilities or the entire exhaust nozzle may be articulated by rotatable inter-connecting ducts similar to what is utilized in the YAK-141 Russian built aircraft manufactured by Yakovlev Aircraft Company in order to produce vectoring capabilities. This invention is concerned primarily with the types of variable convergent/divergent exhaust nozzles that are movable by means other than the components of the exhaust nozzle. In other words, a plurality of upstream ducts connected to the exhaust nozzle have the capability of rotating relative to one another to change the direction of the engine flow medium in said ducts and the rotation thereof rotates the entire exhaust nozzle from an axial position for horizontal flight to a radial position for vertical flight and attitudes therebetween and to a transverse position for producing yaw to the aircraft.

Amongst the problems associated with these types of nozzles are that the nozzle must be sufficiently short in order to provide adequate ground clearance during short takeoff and vertical landing operation. In addition certain types of STOVL propulsion systems, such as those that utilize a shaft driven lift fan concept, require a high response, large turn-down-ratio nozzle to provide acceptable thrust split control for the thrust produced by the nozzle and the power required to power the shaft driven lift fan in STOVL mode of operation.

To achieve an acceptable high response nozzle actuation system it is necessary to utilize actuators for varying the throat size of the C/D exhaust nozzle. These actuators typically are hydraulic types of actuators that utilize the engine's fuel for the hydraulic medium. This invention contemplates utilizing an hydraulic actuator utilizing fuel as the hydraulic medium.

As one skilled in this art will appreciate, the size of the actuator that is necessary to match the power requirement of the C/D nozzle actuation system would have to be significantly large and hence, heavy and require adequate envelope. In addition the amount of fuel necessary to accommodate this type of actuator would require significantly large flexible fuel lines. Fuel lines need to be flexible because the articulating ducts are counter rotating and available space to accommodate the fuel lines require that the fuel lines be flexible. Hence, not only would the size be impractical, but would also be exceedingly heavy and the flexibility of the ducts would be adversely impaired. Moreover, the engine's fuel pump would either be overly taxed or insufficiently sized to accommodate the demand for changing the positions of the flaps in the desired time.

The compact nozzle disclosed in the copending patent application filed by Cires et al, supra, does not locate the balancing sync ring within the static structure and hence, does not permit the exhaust nozzle to remain a full-hoop construction. This invention obviates this problem as well as mounting of the hydraulic actuator to allow for access to the attaching bolts, and locates the converging flap pivot to allow for flap cooling and utilizing rollers on the sync ring to facilitate the rectilinear movement thereof.

This invention achieves a full-hoop structure that resists pressure and structural deflections so as to maintain critical sealing surfaces in contact and the enclosing of the sync ring by static structures provides positive sealing even when deflections are induced by pressure. By enclosing and locating the hydraulic actuator within the sync ring reduces the torsional moment caused by the actuator load being offset from fulcrum link. The airframe installation envelope is reduced by radially inboard location of the actuators.

SUMMARY OF THE INVENTION

An object of this invention is to provide an improved axisymmetrical C/D exhaust nozzle.

Another object of this invention is to enclose the actuation rod of the hydraulic actuator and align it with the sync ring.

Another feature of the invention is to attach the actuator to the static structure to allow for access to the attaching structure.

A still further feature of this invention is providing the support structure for the convergent nozzle's pivot mechanism so as to enhance the cooling ability of the flap cooling system.

The foregoing and other features of the present invention will become more apparent from the following description and accompanying drawings.

DETAILED DESCRIPTION OF THE PREFERRED EMBODIMENT

In this description and claims the terms unison ring, syncrhronizing ring and sync ring are terms that mean the same and are used interchangeable herein.

Figure 1:
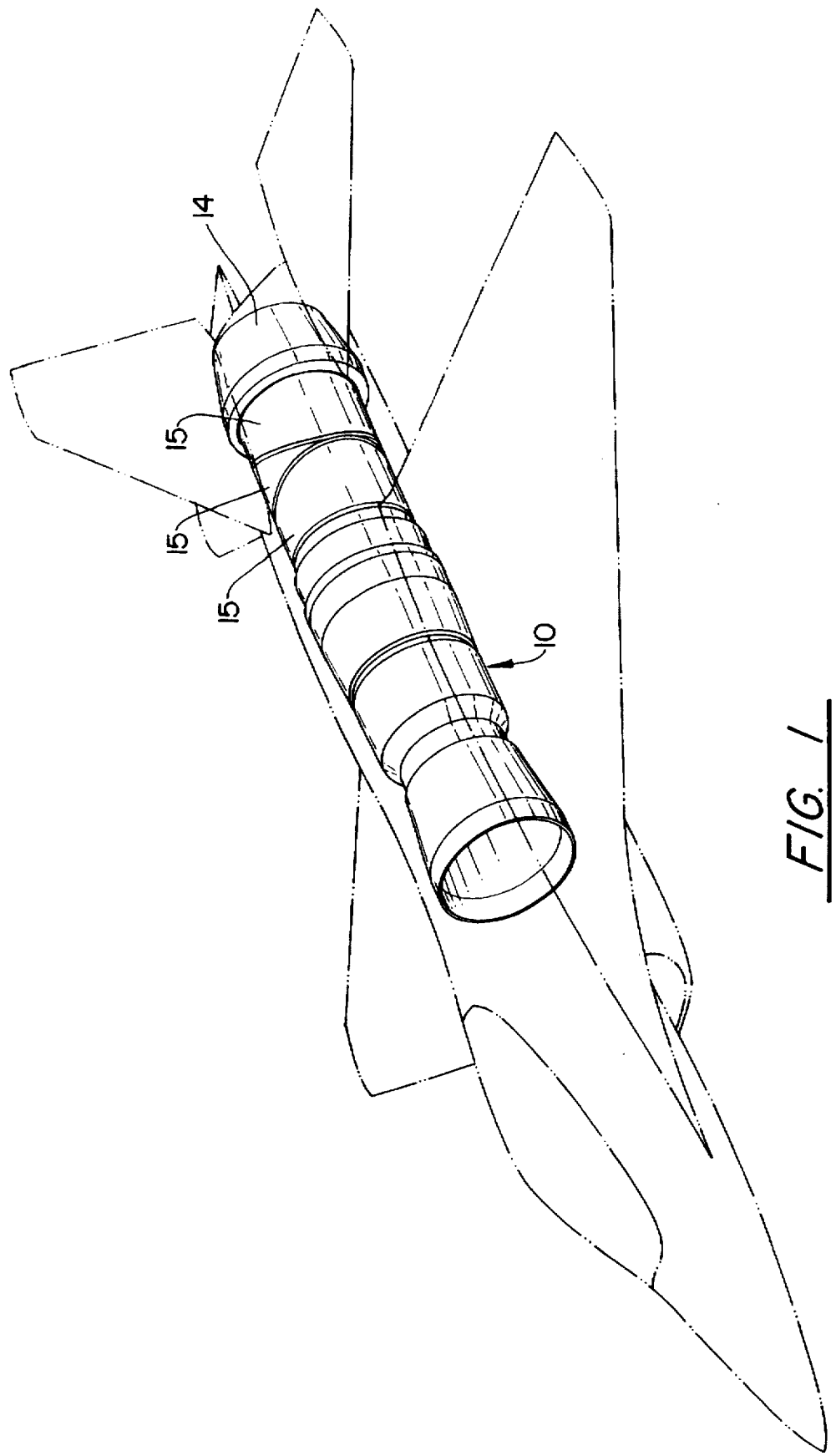
FIG. 1 is a view in phantom and perspective schematically illustrating the turbine power plant mounted in an aircraft with articulating ducts connected to an exhaust nozzle.
Figure 2:
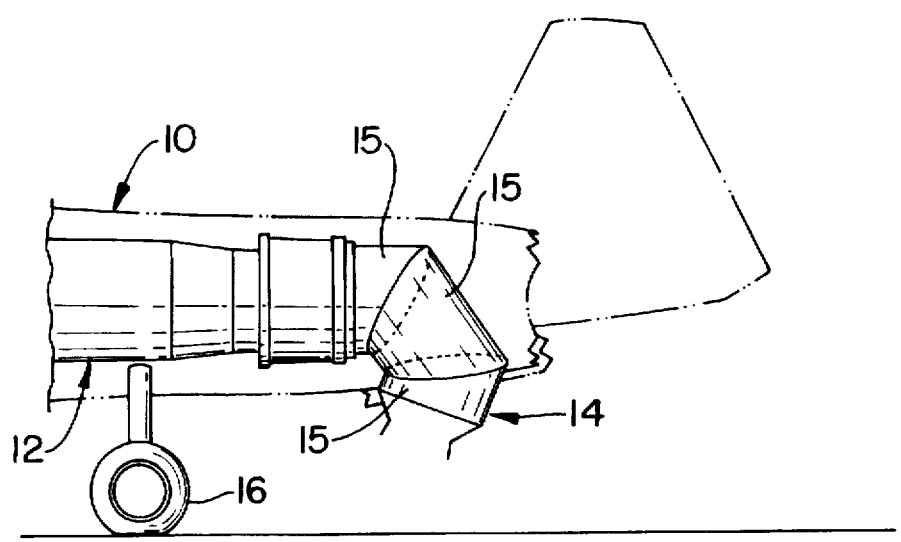
FIG. 2 is partial and phantom views illustrating the ducts being articulated from the position in FIG. 1 for STOVL operation.

As seen in FIGS. 1 and 2 the engine generally indicated by reference numeral 10 is mounted in an aircraft generally indicated by reference numeral 12 which engine includes the axisymmetrical exhaust nozzle generally indicated by reference numeral 14 and the three bearing ducts generally indicated by reference numeral 15. The ducts 15 are capable of being counter-rotated and as shown in FIG. 1 are positioned for horizontal flight condition and in FIG. 2 for STOVL condition. Positioning the nozzle for obtaining the vectoring feature is by articulating the three ducts to rotate around the respective bearings to attain the desired attitude. As seen in FIG. 2 when the aircraft is on the ground and the wheels 16 are extended and the exhaust nozzle is in STOVL condition, it is imperative that the length of the exhaust nozzle is sufficiently short so that it doesn't touch the ground.

Figure 3:
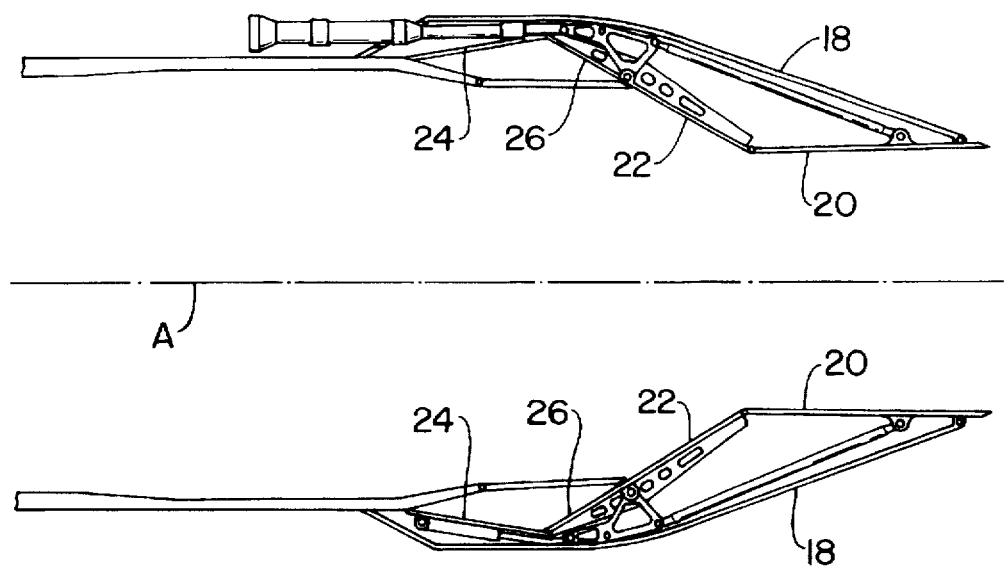
FIG. 3 is a schematic view of a prior art exhaust nozzle.

FIG. 3 exemplifies a typical prior art exhaust nozzle that if utilized in the embodiment disclosed in FIGS. 1 and 2, would not be capable of meeting the criteria noted above. As noted in this embodiment the exhaust nozzle consists of the external flaps 18, divergent flaps 20 and convergent flaps 22. In addition to these flaps the prior art exhaust nozzles require balancing flaps which are depicted by reference numerals 24 and 26. For a more detailed description of the prior art exhaust nozzle reference should be made to U.S. Pat. No. 3,792,815, supra and which is incorporated herein by reference.

Figure 4:
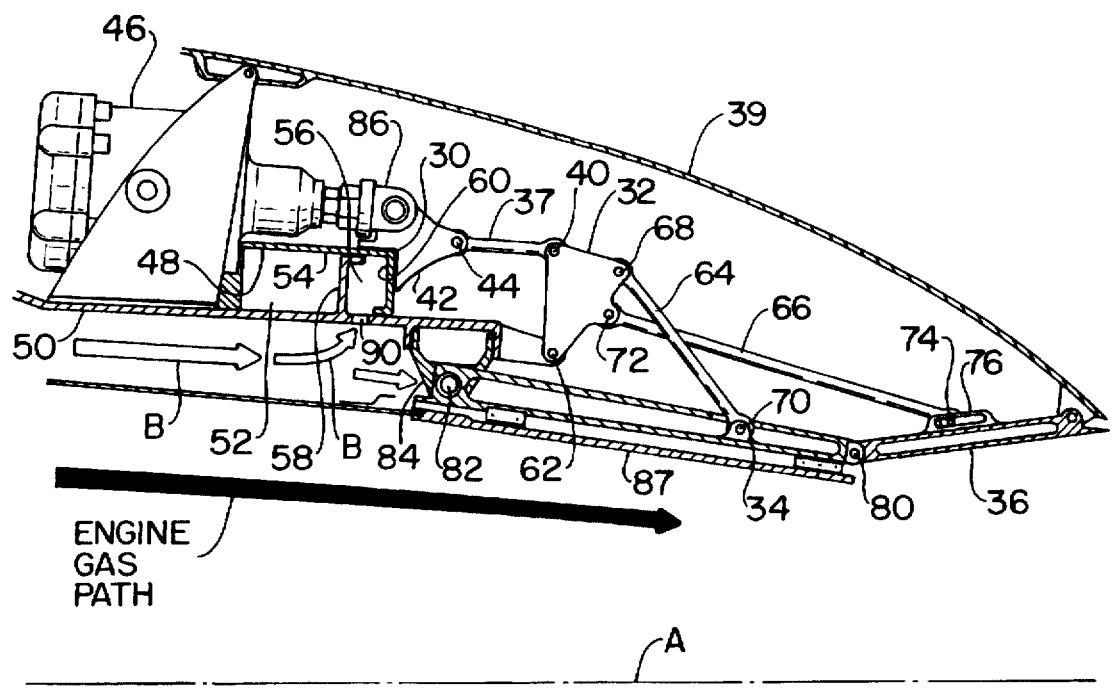
FIG. 4 is a view partly in elevation and partly in section schematically illustrating a C/D axisymmetrical exhaust nozzle.
Figure 5:
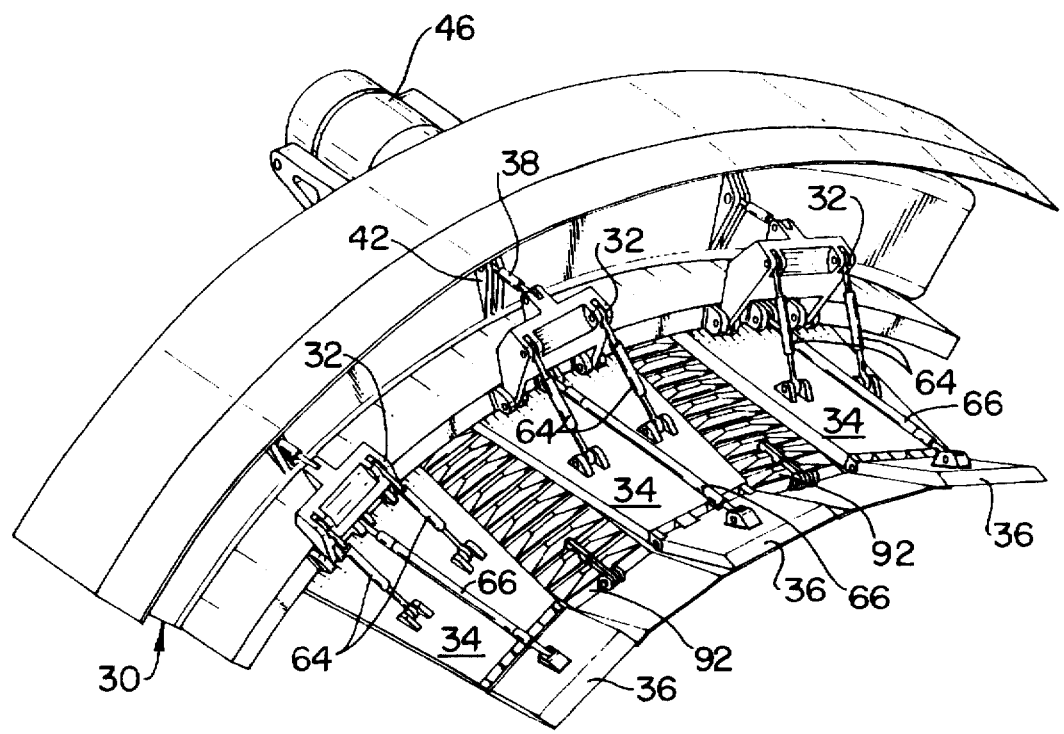
FIG. 5 is a partial view in perspective illustrating the exhaust nozzle of FIG. 6.

FIGS. 4 and 5 which are views partially in section and partially in elevation and perspective which show the compact axisymmetrical exhaust nozzle as being comprised of a combined actuator synchronizing ring and pressure balancing piston (PBSR) 30, fulcrum links 32, convergent flaps 34, divergent flaps 36 and the attendant connecting links as will be more fully described hereinbelow. An external flap 39 for providing an aerodynamically clean surface is also provided.

The fulcrum 32 which is generally triangularly shaped is operatively connected to the hydraulic actuator 46 by the link 37 which is pivotally connected to pivot 40 and the connecting link 42 which is pivotally connected to pivot 44. In this embodiment three actuators are equally spaced about the axis A. The PBSR 30 consist of a toroidally shaped housing 48 that is coaxially mounted relative to the engine's center axis A and is completely enclosed by virtue of the static annular structure 50 for defining chamber 52. Chamber 52 is divided into subchambers 54 and 56 by the radially extending annular member 58.

It will become apparent from the description to follow that the housing 48 moves axially relative to the static structure 50 and the chamber 56 serves as a working chamber such that the fluid admitted therein acts against the inner surface 60 of housing 48 much like the action of a typical piston. This pressure serves to urge the housing 48 toward the right as the pressure builds up in chamber 56 urging the connecting member 42 and link 38 to rotate the fulcrum 32 about its pivot connection 62 to balance the load of the flaps. Links 64 and 66 are respectively connected to the convergent flaps 34 via the pivotal connections 68 and 70 and the divergent flaps 36 via the pivotal connection 72 and the sliding connection 74 sliding in track 76 which in turn is integrally formed on the back surface of the flap 36. Obviously, the flaps 34 and 36 are hingedly connected to each other by the hinge connection 80 and the divergent flap is connected to the static structure 50 via the pivotal connection 82 and the fixed support arm 84. The PBSR 30 reacts the loads that are transmitted through the linkage and fulcrum from the convergent flaps and the divergent flaps to balance the load produced thereby. Essentially, this serves a similar purpose as the balancing flaps disclosed in the 3,792,815 supra, so that these components are eliminated and a significant reduction in the C/D nozzle length is realized.

A cooling liner 87 may be attached to the flap 34 for assuring the structural integrity of the parts. The cooling liner 87 is radially spaced from the flap 34 to define an axial passage for flowing fan air therein to cool the convergent flap. As noted, the conventional seal flaps 92 are utilized to prevent the engine working medium from escaping from the gas path between adjacent flaps.

In operation, to deploy the flaps from the position shown in FIG. 4, for reducing the size of the throat of the nozzle (at the juncture of the divergent and convergent flaps) and changing the C/D configuration, the actuators 46 are actuated by fuel (not shown) in a well known manner which causes the actuator connecting rod 86 to move toward the right. At the same time the pressure from the fan discharge air depicted by arrows B which is admitted through a plurality of holes 90 spaced around the circumference (one being shown) causes the PBSR 30 to add to the force produced by actuator 46. This force is transmitted to the fulcrum 32 via the linkages as described above. The fulcrum 32, in turn, positions the flaps to the desired C/D configuration. Hence, pressure balancing is achieved by virtue of the fan air pressurized piston and since the piston is in reality a synchronizing ring which is attached to all of the convergent and divergent flaps the necessity of the balancing flaps disclosed in the prior art is eliminated. This obviously results in a shorter C/D exhaust nozzle and requires fewer parts. Since the divergent flap links 66 are grounded to the pivoting fulcrum links 32 the engine designer has a great deal of flexibility in selecting area ratio schedules.

It is estimated that there is substantially a 100% reduction in the convergent nozzle length over the heretofore known C/D nozzles. Also this kinematic system which requires less parts than heretofore known systems, results in substantially a 50% reduction in actuator stroke further reducing the overall length of the nozzle.

Figure 6:
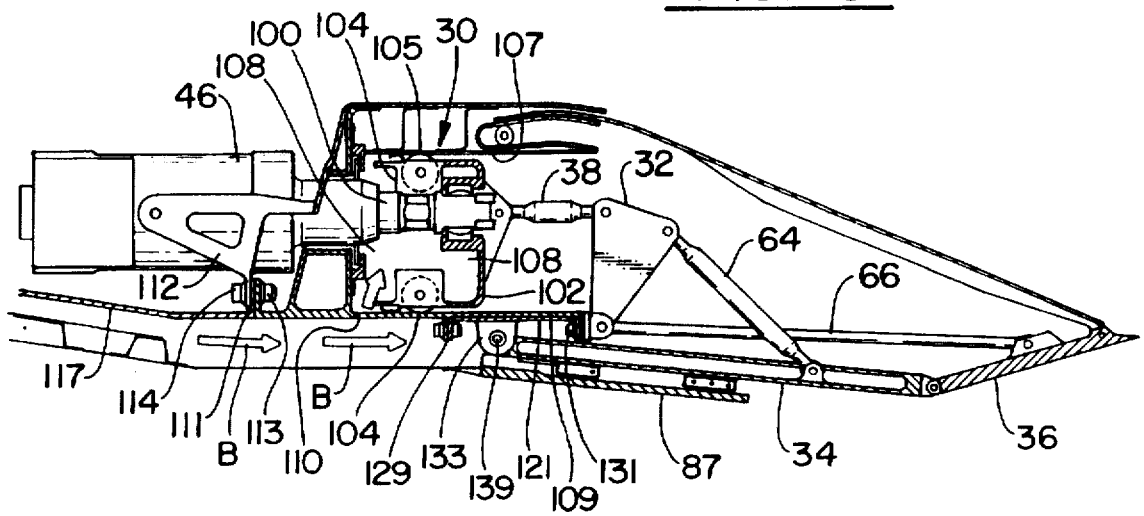
FIG. 6 is a view partly in elevation and partly in section illustrating another embodiment illustrating the detaisl of this invention.

FIG. 6 exemplifies another embodiment of this invention where the actuator 46 (like parts depicted in all the Figs. bear the same reference numerals) is mounted within the synchronous ring the PBSR 30. The PBSR is configured differently and comprises the housing 102 which is generally U-shaped in cross section and carries a pair of diametrically spaced pockets 104 supporting rollers 105 that each roll on the surface of the annular static structures 107 and 109. These surfaces are sealing surfaces and require suitable sealing members. The working chamber 108, similar to the working chamber 56 in FIG. 4, receives pressurized fan discharge air depicted by arrows B. The positions of the linkages connecting the fulcrum member 32 and actuator 46 and convergent and divergent flaps are slightly altered from that shown in FIG. 4. However, it is apparent from FIG. 6, that the operation of C/D nozzle with this slightly changed linkage system and synchronizing ring/piston combination is substantially the same as that described in connection with the embodiment depicted in FIG. 4. In this embodiment (FIG. 6) and in accordance with this invention the mounting bracket 112 supporting the actuator 46 is designed so that the bracket is attached to flanges 111 and 113 formed on the aligned annular static structures 117 and 119 and secured by a plurality of nuts and bolts 114 (one being shown). This design permit the exhaust nozzle to remain a full-hoop structure eliminating the weakening cut-outs and facilitating fabrication with these benefits:

1) The full-hoop configuration resists pressure and structural defections to maintain critical sealing surfaces in contact.

2) Placement of the actuators 46 within the synchronization ring reduces torsional moment caused by actuator load being offset from the fulcrum.

3) Airframe installation envelope is reduced by radially inboard relocation of actuators.

4) Synchronization ring is surrounded by static structure, allowing for positive sealing due to possible pressure induced deflections.

5) Relocation of sealing surfaces permits synchronization ring to be a four-sided full-hoop structure to enhance resistance to any variations in convergent flap or actuation load.

The pivot support includes an annular frame with opposing flanges 129 and 131 that are bolted to the underside of the static structure 119. This allows the depending flange 133 to be retracted radially outwardly which allows the pivot point 139 to be raised and positioned away from the inlet to the cooling passageway formed between the flap surface of flap 34 and the inner surface of liner 87, resulting in improved cooling of the convergent flaps.

Although this invention has been shown and described with respect to detailed embodiments thereof, it will be appreciated and understood by those skilled in the art that various changes in form and detail thereof may be made without departing from the spirit and scope of the claimed invention.

I claim:

1. A C/D exhaust nozzle for gas turbine engine power plants powering aircraft, said exhaust nozzle include convergent flaps and divergent flaps, a pressure balancing sync ring means for balancing the loads of said convergent flaps and said divergent flaps, actuation means for actuating said exhaust nozzle to change its C/D configuration, said actuation means includes an hydraulic actuator connected to said sync ring means, said actuation means being positioned within said sync ring means, said exhaust nozzle including concentrically disposed pair of spaced annular static structures, and said sync ring being disposed between said pair of spaced annular static structures whereby the C/D exhaust nozzle is a full hoop mechanism.

2. A C/D exhaust nozzle for gas turbine engine power plants powering aircraft as claimed in claim Including flanges extending from said static structure, a bracket attached to said actuator, and bolt and nut assembly for attaching said bracket to said flanges whereby said nut and bolt assembly are accessible for ease of installation and removal thereof.

3. A C/D exhaust nozzle for gas turbine engine power plants powering aircraft as claimed in claim 2 including a fulcrum, linkage means interconnecting said actuator, said sync ring means, said convergent flaps and said divergent flaps to said fulcrum lever, said sync ring including a housing having concentrically extending portions coaxial relative to the axis, and rollers mounted on said extending portion for riding on said static structures.

4. An axisymmetrical C/D exhaust nozzle for gas turbine engine power plants having a central axis powering STOVL aircraft, said exhaust nozzle including convergent flaps and divergent flaps, a sync ring coaxially disposed relative to said axis for positioning said convergent flaps and said divergent flaps, a hydraulic actuator for actuating said sync ring to change configuration of said exhaust nozzle, said sync ring defining piston means for balancing the loads created by said convergent flaps and said divergent flaps, said exhaust nozzle including concentrically disposed pair of spaced annular static structures, and said sync ring being disposed between said pair of spaced annular static structures whereby the C/D exhaust nozzle is a full hoop mechanism.

5. An axisymmetrical C/D exhaust nozzle for gas turbine engine power plants having a central axis powering STOVL aircraft as claimed in claim 4 wherein said static structure includes working surfaces, roller means mounted on said sync ring for rolling on said working surfaces whereby said sync ring moves axially when actuated by said actuator.

6. An axisymmetrical C/D exhaust nozzle for gas turbine engine power plants having a central axis powering STOVL aircraft as claimed in claim 5 wherein said sync ring includes a housing having a pair of spaced annular axially extending members concentrically disposed relative to said axis, and means defining pockets formed in each of said pair of spaced annular extending members for rotary supporting said rollers.

7. For an axisymmetrical C/D exhaust nozzle for gas turbine engine power plants having a central axis powering STOVL aircraft as claimed in claim 6 including a fulcrum link attached to said actuator for pivotal movement, link means for attaching said divergent flap to said fulcrum link and said convergent flap to said fulcrum link said link means including a pivot connection attached to said static structure and one of said links of said link means and said fulcrum, a support for supporting said pivot connection, said support including a bracket having end flanges, said end flanges adapted to mate with flanges formed on one of said pair of static structures, a cooling liner concentrically disposed relative to said convergent flap and spaced therefrom for defining a cooling passage whereby said connection means is spaced from the entrance of said cooling passage.

* * * * *